United States Patent
Racine et al.

(10) Patent No.: US 11,927,863 B2
(45) Date of Patent: Mar. 12, 2024

(54) LIQUID CRYSTAL PHASE MODULATION DEVICE

(71) Applicant: COMMISSARIAT A L'ENERGIE ATOMIQUE ET AUX ENERGIES ALTERNATIVES, Paris (FR)

(72) Inventors: Benoît Racine, Grenoble (FR); Arnaud Verdant, Grenoble (FR); Pierre Joly, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/081,554

(22) Filed: Dec. 14, 2022

(65) Prior Publication Data
US 2023/0194944 A1 Jun. 22, 2023

(30) Foreign Application Priority Data
Dec. 17, 2021 (FR) ...................................... 2113768

(51) Int. Cl.
*G02F 1/137* (2006.01)
*G01J 9/02* (2006.01)
(Continued)

(52) U.S. Cl.
CPC ............... *G02F 1/137* (2013.01); *G01J 9/02* (2013.01); *G02F 1/133738* (2021.01); *G02F 1/134336* (2013.01); *G02F 1/13439* (2013.01); *G02F 1/1368* (2013.01); *G02F 2203/02* (2013.01); *G02F 2203/50* (2013.01)

(58) Field of Classification Search
CPC .. G02F 1/137; G02F 1/13731; G02F 1/13768; G02F 1/13787; G02F 1/133738; G02F 1/133773; G02F 1/134336; G02F 1/134345; G02F 1/134381; G02F 1/13439;
(Continued)

(56) References Cited

U.S. PATENT DOCUMENTS 6,219,113 B1 * 4/2001 Takahara .......... G02F 1/133526
345/98
9,252,282 B2 * 2/2016 Iyama ................. H01L 29/7869
(Continued)

FOREIGN PATENT DOCUMENTS

CN 103235462 A * 8/2013
CN 103235462 A 8/2013
(Continued)

*Primary Examiner* — Hoan C Nguyen
(74) *Attorney, Agent, or Firm* — BakerHostetler

(57) ABSTRACT

A device for modulating the phase of a light beam includes a matrix of elementary cells, called pixels, coupled to a circuit for addressing the pixels, the device further comprising a set of so-called lateral electrodes extending in a so-called vertical direction (Y) at right angles to the alignment direction (Xa) and configured to apply, for each pixel and via at least two lateral electrodes, a so-called acceleration voltage generating a lateral electrical field (Era) substantially parallel to the alignment direction, in a vector allowing an accelerated return of the liquid crystal molecules to their orientation of rest, the acceleration voltage being configured to be applied in a phase called acceleration relaxation phase, when the activation voltage is no longer applied.

17 Claims, 18 Drawing Sheets

(51) Int. Cl.
*G02F 1/1337* (2006.01)
*G02F 1/1343* (2006.01)
*G02F 1/1368* (2006.01)

(58) Field of Classification Search
CPC ............... G02F 1/1368; G02F 2203/02; G02F 2203/50; G01J 9/02
See application file for complete search history.

(56) References Cited

U.S. PATENT DOCUMENTS

| | | | |
|---|---|---|---|
| 2005/0213024 A1* | 9/2005 | Wang | ................ G02F 1/134309 349/197 |
| 2010/0296013 A1 | 11/2010 | Hung et al. | |
| 2015/0042938 A1* | 2/2015 | Shi | .................... G02F 1/134309 29/829 |
| 2015/0325973 A1* | 11/2015 | Dupret | ................. G03H 1/0443 349/1 |
| 2015/0346569 A1 | 12/2015 | Lin et al. | |
| 2016/0178979 A1 | 6/2016 | Kita et al. | |
| 2018/0059490 A1* | 3/2018 | Chen | ................ G02F 1/134336 |
| 2018/0067366 A1 | 3/2018 | Kimura et al. | |
| 2018/0350311 A1 | 12/2018 | Aoyama et al. | |

FOREIGN PATENT DOCUMENTS

WO 2014/087099 A1 6/2014
WO 2014/153951 A1 10/2014

\* cited by examiner

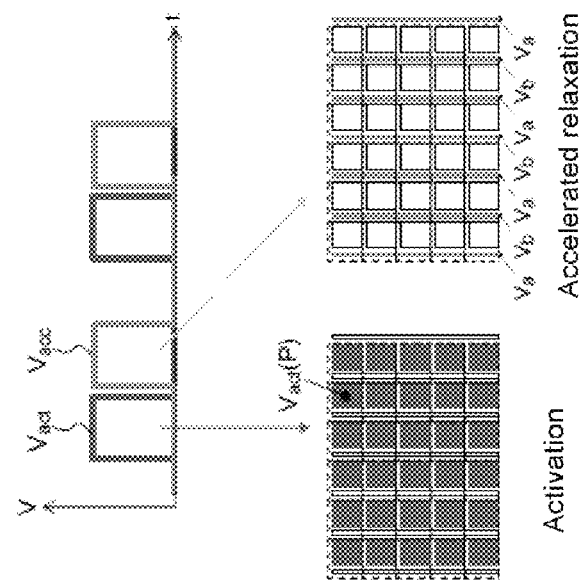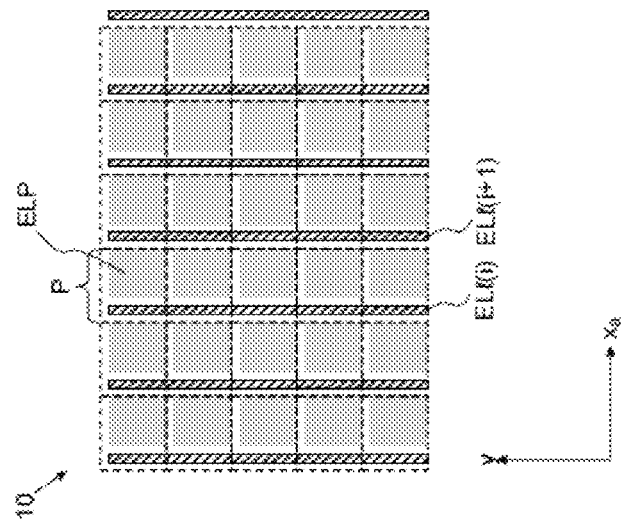
FIG. 7

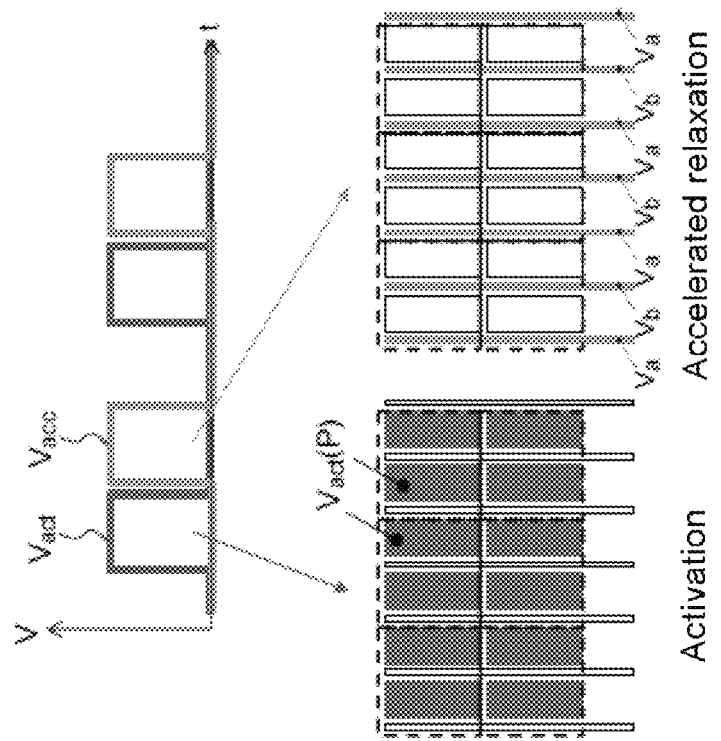
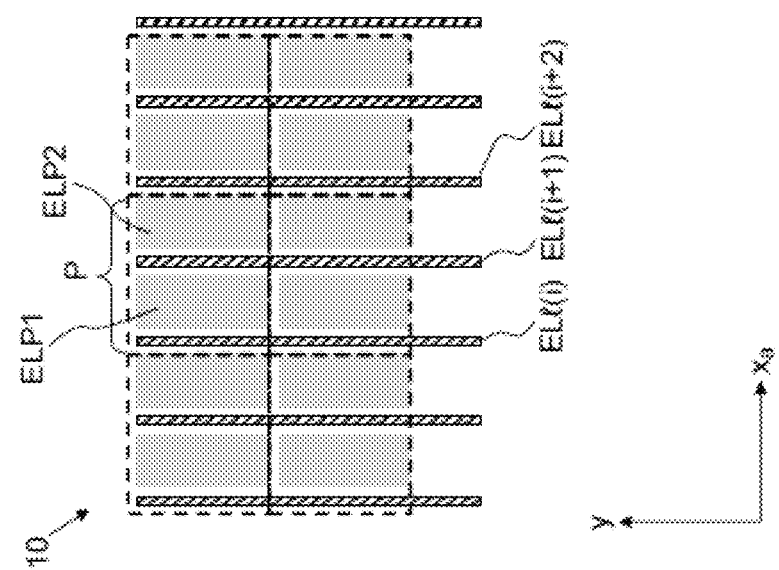
FIG.8

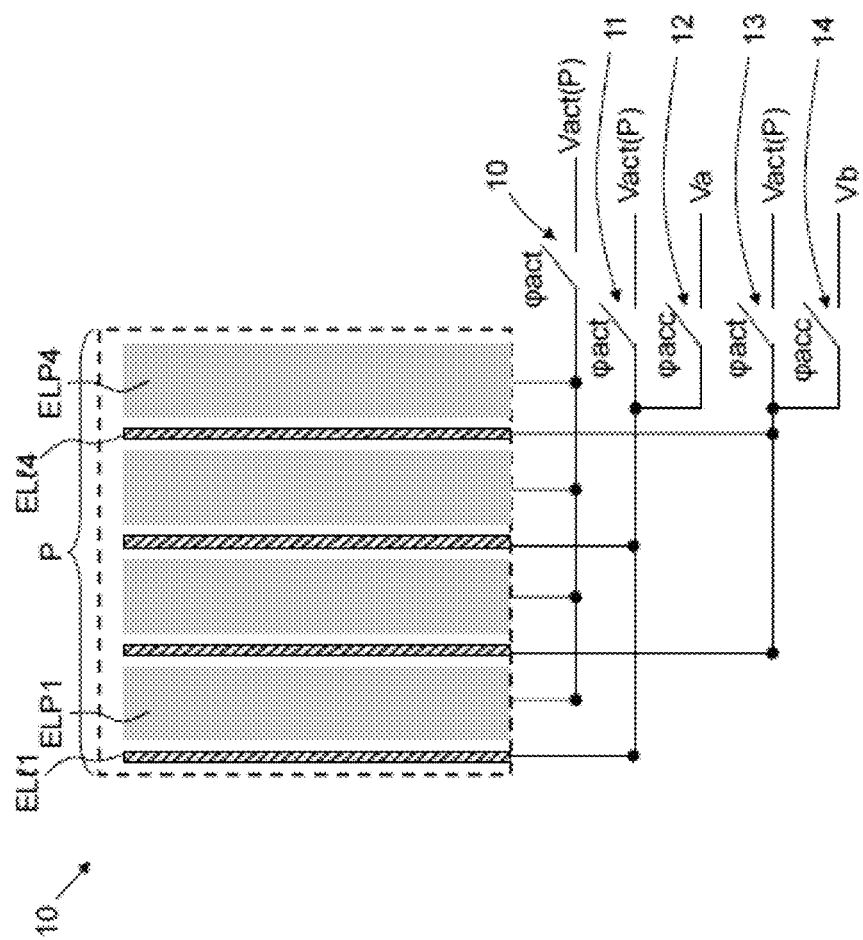

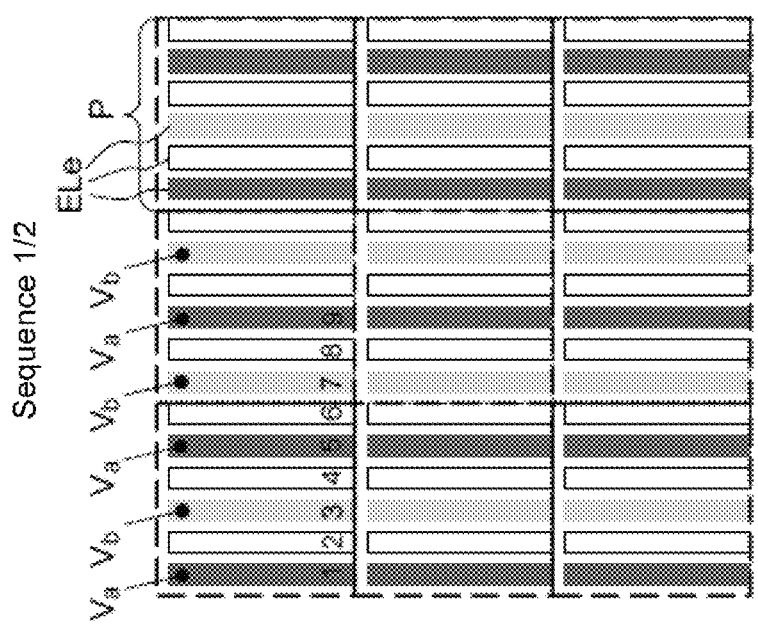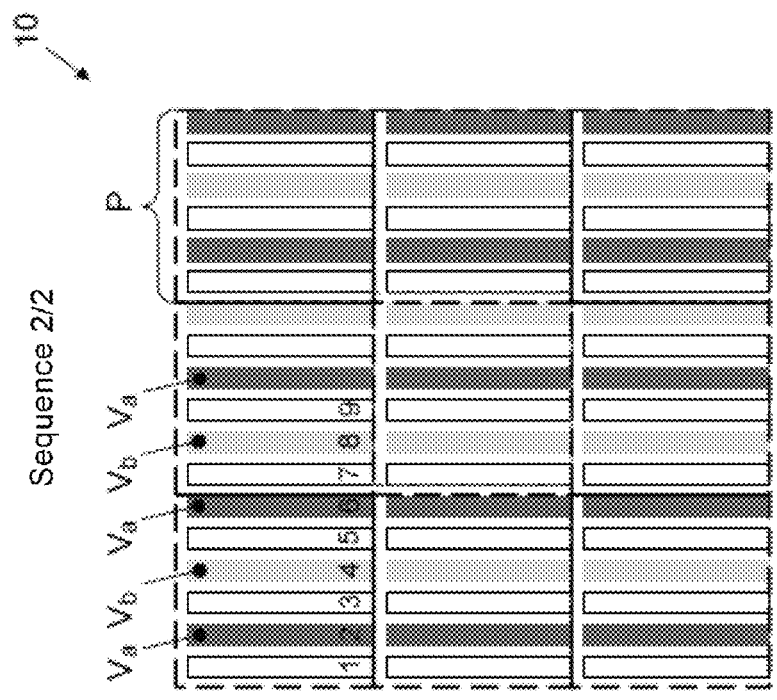
FIG. 14

LIQUID CRYSTAL PHASE MODULATION DEVICE

CROSS-REFERENCE TO RELATED APPLICATION

This application claims priority to foreign French patent application No. FR 2113768, filed on Dec. 17, 2021, the disclosure of which is incorporated by reference in its entirety.

FIELD OF THE INVENTION

The present invention relates to crystal phase modulation devices, and more particularly the devices of this type that exhibit an enhanced response time.

BACKGROUND

Liquid crystal devices are known for the production of displays (LCD, for liquid crystal display), which modulate a light beam in amplitude. These displays have a matrix structure, and each elementary liquid crystal cell forms a pixel of the display. The orientation of the liquid crystal molecules is modified by the application of a field between two electrodes disposed either side of the liquid crystal layer, a so-called pixel electrode and a transparent electrode common to all the pixels. Each pixel is addressed via at least one control transistor located on the pixel and linked to the pixel electrode, and which is linked to a control circuit in order to apply the desired electrical voltage to the pixel. The term control transistor is used to describe an elementary transistor which is configured to apply the desired voltage to the pixel. The application of this voltage for a pixel can be implemented via several elementary transistors. A modification of the orientation of the liquid crystal molecules induces a modification of the polarisation of the incident beam, which creates a modification of the transmission through a polariser. Several liquid crystal structures are known for the displays: TN (Twisted nematic) mode, VA (Vertically Aligned) mode, IPS (In Plane Switching) mode.

The liquid crystal modulators, known generically as SLM (Spatial Light Modulator), used to produce direct vision displays (television, computer screen) operate by transmission. The two electrodes are then transparent, the control transistor or TFT (thin film transistor) is located in a corner of the pixel, and the addressing circuit is partially located on the edges of the display, a part of the processing being able to be performed in an external processing unit.

For projection applications, it is also possible to use liquid crystal structures operating by reflection. In this case, the pixels are of smaller size and the liquid crystal layer is deposited on a silicon substrate in which the addressing circuit is partially located. The pixel electrode is then reflecting. This type of display is called LCOS (Liquid Crystal on Silicon).

The SLMs, based on the electric control of the optical properties of a liquid crystal layer, typically nematic, are more generally suited to spatially modifying the phase, the amplitude or the polarisation state of a light wave.

The phase modulators have applications in holography, wavefront correctors, laser pulse shaping, etc. They can operate by transmission or by reflection (LCOS). A liquid crystal spatial phase modulator, or LC-SPM, is thus an electro-optical system which uses a liquid crystal matrix controlled electrically to provide, at any point of an incident beam, a local modification of its phase. For the phase modulation, a preferred embodiment is a so-called PAN (Parallel Aligned Nematic), also called "Electronically Controlled Birefringence" (ECB) liquid crystal structure, of which a pixel is illustrated in FIG. 1 for the case of an LCOS (reflection).

In this ECB structure, the nematic liquid crystal molecules are parallel to one another at rest. The substrate S1 is topped by a stack of metallisation layers comprising conductive tracks PM separated by an insulating material MI. In an upper level of the interconnecting stack EI there is defined a first electrode EL1, called pixel electrode, reflecting, which covers a large part of the pixel (typically made of aluminium or of copper). On the surface of the interconnection stack there is formed a stack of a first alignment layer CA1 (attachment and alignment of the liquid crystals), a liquid crystal layer CL, a second alignment layer CA2 and a conductive layer forming a second electrode EL2 (typically made of indium oxide or ITO), all the layers being transparent. The layers CA1 and CA2 align the liquid crystal in a defined direction Xa. For example these layers are made of polymer, typically of polyimide, that has parallel striations on the surface on the liquid crystal side which force its alignment. Also, by way of example, the stacking comprises a top plate S2 typically of glass. The materials of the various layers are chosen to avoid stray reflections.

The elements for applying control voltage to the electrodes EL1 and EL2 are not described in detail, the production of tracks and/or vias for accessing the electrodes EL1 and EL2 are well known in the integrated circuit techniques.

The operation of a reflection mode LC-SPM of ECB type is illustrated in FIG. 2. It is composed of two parts, a CMOS part comprising the silicon substrate incorporating at least a part of the addressing and an elementary liquid crystal cell CE.

In A0, the molecules are at rest, that is to say without voltage applied between EL1 and EL2, the molecules are parallel to one another and parallel to the plane of the layer CL and of the device 5, oriented in the direction Xa.

In B0, the application of a voltage between EL1 and EL2, called activation voltage, generates an activation electrical field Ea which modifies the orientation of the liquid crystals. This phase of addressing of the liquid crystals is called activation. The orientation of the molecules is adjusted pixel by pixel, the electrode EL1 being defined independently in each of the pixels. The birefringence of the liquid crystal layer is a function of this orientation, and therefore the phase-shift induced on the incident wave depends on this applied activation voltage.

If the polarisation of the incident light is parallel to the axis Xa, the applied voltage is directly linked to the phase shifting of the light. The maximum delay $\Delta\Phi$, generated on an incident light of wavelength $\lambda$ by a liquid crystal layer of thickness e and of which the ordinary n0 and extraordinary ne refractive index difference is written as $\Delta n$ ($\Delta n = ne - n0$), is expressed by:

$$\Delta\Phi = (2\eta/\lambda) \cdot \Delta n \cdot e.$$

Thus, for the device 5 which acts on the reflected light beam, after a round trip in the liquid crystal layer, the maximum phase-shift generated is therefore $2 \cdot \Delta\Phi$. The birefringence $\Delta n$ is a characteristic of the liquid crystal molecules used, and varies typically between 0.1 and 0.3. The choice of the thickness of the liquid crystal layer therefore makes it possible to have freedom as to the choice of the liquid crystal molecules for a phase modulation of the reflected beam. Thus, for operation in ECB mode, the incident light should be polarised so as to be aligned with the orientation of the liquid crystal at rest.

The curve 19 illustrates the activation voltage Vact applied during the activation phase to obtain a desired orientation of the molecules. To accelerate the straightening of the molecules, an overvoltage 18, or "overshot", is applied at the start of the phase. The curve 20 illustrates the variation of the angle of inclination θ of the liquid crystal molecules, which can be represented by sticks being oriented according to the direction of the electrical field, in the plane (Xa, Z) of the device. It takes a certain time, called response time, for the orientation of the molecule to reach the desired orientation value corresponding to the desired phase difference. Since the crystal molecules are oriented according to the direction of the electrical field independently of its vector, a square alternating field is preferentially applied to avoid the electrolysis effects.

In C0, in a so-called relaxation phase, the activation voltage ceases to be applied, the molecules return to their position of rest. It will then be possible to once again apply an activation voltage corresponding to a new desired orientation. The curve 21 illustrates the return to the position of rest, characterized by a relaxation time. This return phase is purely mechanical, with a speed of return to the initial position that is a function of the viscosity of the liquid crystal. Note that the relaxation time is significant, and that it will therefore be necessary to wait for a certain time before being able to refresh the SPM, which limits it operating frequency.

It is also possible to use an amplitude modulation of the incident beam by inserting a polariser between the interconnection stack EI and the alignment layer CA1.

In a particular LCOS mode described in the document WO2014/087099, an LC-SPM device is hybridised with a detection function. FIG. 3 describes this device 30 in perspective and FIG. 4 in profile. The structure is close to the LCOS of FIG. 1, except that the pixel electrode EL1 has an aperture 58 which allows passage of a portion of the coherent incident beam 32 (having undergone transformations before arriving on the device 30), which interferes with a reference beam 36 from a same source. A photodetector PD is incorporated in the silicon substrate and disposed opposite the aperture 58, and provides the detection function. Thus, one portion of the incident beam is detected by PD and the other portion is reflected by the electrode EL1, and passes back through the liquid crystal forming the beam 44, the phase of which is modified by control of the liquid crystal, as explained previously.

The phase of the beam 32 (measurement of the wavefront) is accessed by interferometry with the beam 36, by measuring the intensity resulting from the interference.

The objective of this device is to a carry out measurement of the wavefront of the beam 32, then proceed to shape the reflected beam 44 (so-called "playback" wave), in a way dependent on the wavefront measurements performed. A processing device that is not represented receives the information from the photodetector and defines, as a function of the information on the wavefront detected by PD, the phase modulation that the SPM must apply. Each pixel simultaneously handles the detection function and the phase modulation function.

This type of device has applications in adaptive optics, for parallel-modulating optical communication channels, in interferometry, etc. Nevertheless, one limitation on the operating frequency of this device is linked to the slowness of the relaxation, as described above.

SUMMARY OF THE INVENTION

One aim of the present invention is to remedy the above-mentioned drawbacks by proposing a liquid crystal phase modulator that exhibits an accelerated relaxation phase.

The subject of the present invention is a device for modulating the phase of a light beam comprising:
- a matrix of elementary cells, called pixels, coupled to a circuit for addressing said pixels,
- each elementary cell comprising a liquid crystal layer and, on either side of said crystal layer, at least one first electrode, called pixel electrode, controlled by at least one control transistor coupled to said addressing circuit, and a second electrode that is transparent and common to all the cells, the liquid crystal being composed of molecules having a natural orientation of rest in a plane of said device in a so-called horizontal direction of alignment oriented along a so-called horizontal row of pixels, and in the absence of voltage between the at least one pixel electrode and the second electrode, and another orientation outside of said plane of said device in the presence of voltage between the at least one pixel electrode and the second electrode, called activation voltage (Vact), said activation voltage being applied in a phase of activation of the liquid crystal molecules,
- the device further comprising a set of so-called lateral electrodes extending in a so-called vertical direction at right angles to said alignment direction, disposed on a same plane as the pixel electrode and configured to apply, for each pixel and via at least two lateral electrodes, a so-called acceleration voltage generating a lateral electrical field substantially parallel to said alignment direction, with a vector allowing an accelerated return of the liquid crystal molecules to their orientation of rest, said acceleration voltage being configured to be applied in a phase called accelerated relaxation phase, when the activation voltage is no longer applied.

According to a variant, the lateral electrodes are thin strips disposed on either side of wider strips forming the pixel electrode or electrodes and in which the acceleration voltage is applied between two adjacent lateral electrodes.

According to an embodiment during the accelerated relaxation phase, one lateral electrode in every two is connected to a first potential and one lateral electrode in every two is connected to a second potential, to apply the acceleration voltage.

According to one embodiment, each pixel comprises a single pixel electrode and a single lateral electrode.

According to another embodiment, each pixel comprises n pixel electrodes forming n strips oriented in the vertical direction and n lateral electrodes.

According to one embodiment, a lateral electrode is common to a vertical row of pixels.

According to one embodiment, the lateral electrode or electrodes of a pixel are specific to each pixel.

According to one embodiment, for each pixel, the lateral electrodes are further configured to apply, in combination with the second electrode, the activation voltage to said pixel during the activation phase.

According to one embodiment, the addressing circuit comprises, for the addressing of a pixel, at least five switching elements, at least three of them for applying said activation voltage, including the at least one control transistor, and at least two of them for applying said acceleration voltage.

According to a second variant, for each pixel, the pixel electrodes and the lateral electrodes are combined and called elementary electrodes, the elementary electrodes taking the form of a strip of substantially identical dimensions and extending in the vertical direction, the elementary electrodes being divided up into a first group and a second group of one strip in every two, the elementary electrodes being configured to apply, in combination with the second electrode, a same activation voltage in the activation phase, the first group of elementary electrodes being configured to apply an acceleration voltage in a first sequence of the accelerated relaxation phase, the strips of the second group being configured at high impedance and at a reference potential, the second group being configured to apply an acceleration voltage in a second sequence of the accelerated relaxation phase, the strips of the first group being configured at high impedance or to a reference potential.

According to one embodiment, the number p of elementary electrodes per pixel is a multiple of 4.

According to one embodiment, the addressing circuit comprises, for the addressing of a pixel, at least four switching elements for applying said activation voltage, including the at least one control transistor, and at least four switching elements for applying said acceleration voltage.

According to one embodiment, the device operates by reflection and also allows a measurement of the wavefront of said incident beam, the at least partially reflecting pixel electrode has an aperture (Op), the addressing circuit of the pixels is at least partially disposed behind said matrix and incorporated in a substrate, said substrate further comprising a plurality of detection elements disposed opposite said apertures.

According to another aspect, the invention relates to a method for addressing a light beam phase modulation device, the addressing device comprising a matrix of elementary cells, called pixels, coupled to a circuit for addressing said pixels, each elementary cell comprising a liquid crystal layer and, on either side of said liquid crystal layer, at least one first electrode called pixel electrode controlled by a control transistor coupled to said addressing circuit, and a second electrode that is transparent and common to all of the cells, the liquid crystal being composed of molecules having a natural orientation of rest in a plane of said layer in a so-called horizontal alignment direction oriented along a so-called horizontal row of pixels, and in the absence of voltage between the pixel electrode and the second electrode, and another orientation outside of said plane of said layer, in the presence of voltage between the pixel electrode and the second electrode, called activation voltage, the device further comprising a set of so-called lateral electrodes extending in a so-called vertical direction at right angles to said alignment direction and disposed on a same plane as the pixel electrode, the method comprising:

an activation phase in which, for each pixel, said activation voltage is applied, an accelerated relaxation phase in which, for each pixel, a so-called acceleration voltage is applied via at least two lateral electrodes, generating a lateral electrical field (Era) substantially parallel to said alignment direction, [with a vector] allowing an accelerated return of the liquid crystal molecules to their orientation of rest, said acceleration voltage being applied when the activation voltage is no longer applied.

According to one embodiment, a lateral electrode is common to a vertical row of the pixels and:

during the activation phase, the lateral electrodes are connected at high impedance or to a reference potential, during the accelerated relaxation phase, the acceleration voltage is applied via two adjacent lateral electrodes disposed on either side of the at least one pixel electrode.

According to one embodiment, each pixel comprises at least one lateral electrode specific to each pixel and:

during the activation phase, the activation voltage is applied between a lateral electrode and the second electrode, during the accelerated relaxation phase, the acceleration voltage is applied via two adjacent lateral electrodes disposed on either side of the at least one pixel electrode.

According to one embodiment, for each pixel, the pixel electrodes and the lateral electrodes are combined and called elementary electrodes, the elementary electrodes taking the form of a strip of substantially identical dimensions and extending in the vertical direction, the elementary electrodes being divided up into a first group and a second group of one strip in every two, and during the activation phase, the activation voltage is applied via the elementary electrodes in combination with the second electrode, and the accelerated relaxation phase comprises two sequences:

a first sequence in which the acceleration voltage is applied via the first group of elementary electrodes, the elementary electrodes of the second group being connected at high impedance or to a reference potential, a second sequence in which the acceleration voltage is applied via the second group of elementary electrodes, the elementary electrodes of the first group being connected at high impedance or to a reference potential.

The following description presents a number of exemplary embodiments of the device of the invention: these examples are not limiting on the scope of the invention. These exemplary embodiments present both the essential features of the invention and the additional features linked to the embodiments considered.

BRIEF DESCRIPTION OF THE DRAWINGS

The invention will be better understood and other features, aims and advantages thereof will become apparent from the following detailed description and in light of the attached drawings given as nonlimiting examples and in which:

FIG. 7 illustrates a first embodiment of a first variant with one pixel electrode and one lateral electrode per pixel, and according to the first mode of implementation.

FIG. 8 illustrates a second embodiment of a first variant, with two pixel electrodes and two lateral electrodes per pixel and according to the first mode of implementation.

FIG. 10*bis* illustrates an example of design of a pixel for the application of the potentials to the electrodes according to the different phases.

FIG. 14 illustrates an exemplary embodiment of the second variant with 6 electrodes per pixel.

DETAILED DESCRIPTION

Figure 5:
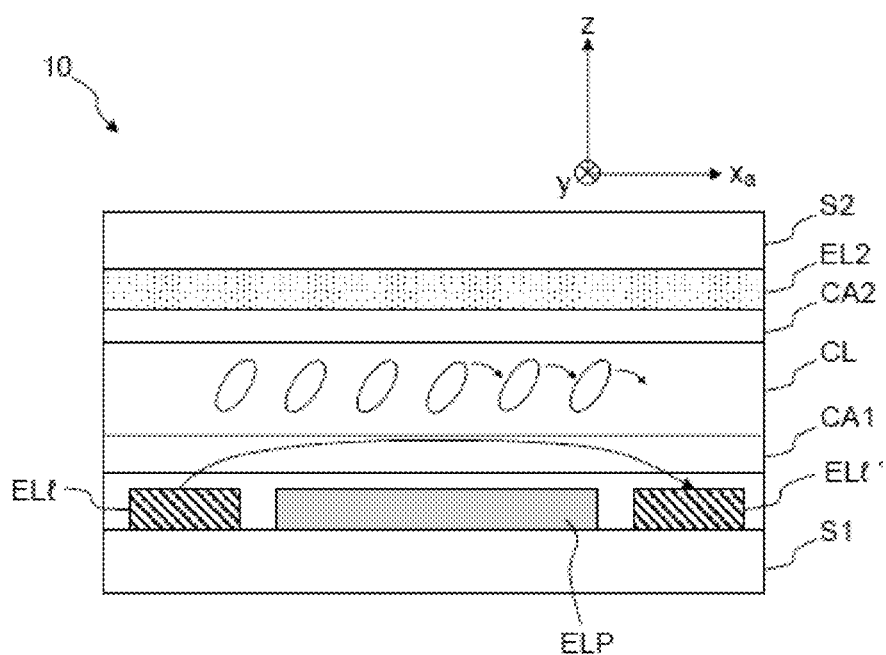
FIG. 5 illustrates a phase modulation device according to the invention.

FIG. 5 illustrates a light beam phase modulation device 10 according to the invention. The device uses the controlled orientation of liquid crystal molecules to provoke a change of index of the medium. When this medium is passed through by the light beam, the controlled change of index is reflected by a controlled time delay $\Delta t$. At a given wavelength, $\lambda$, this time delay corresponds to a phase delay, $\Delta\Phi = (2\pi/\lambda) \cdot c \cdot \Delta t$, in which c is the speed of light. According to one embodiment, the beam passing through the device is temporarily coherent (narrow spectrum) and according to another embodiment, the beam has a wider spectrum, the phase per wavelength information then being obtained on reception.

It comprises a matrix of elementary cells, called pixels, coupled to a circuit for addressing the pixels (not represented). Each elementary cell comprises a liquid crystal layer CL and, on either side of the liquid crystal layer, at least one first electrode called pixel electrode ELP controlled by at least one control transistor (not represented) coupled to the addressing circuit, and a second electrode EL2 that is transparent and common to all the cells. The plan of the device and an axis Z at right angles to this plan are defined.

The cells are of ECB type, that is to say that the liquid crystal is composed of molecules which have:

a natural orientation of rest in a plane of the device in a so-called horizontal alignment direction Xa oriented along a so-called horizontal row of pixels, and in the absence of voltage between the pixel electrode and the second electrode, and, another orientation outside of the plane of said layer in the presence of voltage between the pixel electrode and the second electrode, called activation voltage Vact, the activation voltage being applied in a phase of activation of the liquid crystal molecules. The activation voltage is specific to each pixel (as a function of the desired orientation of the molecules and therefore of the desired phase) and applied via the associated transistor.

The natural orientation on Xa is obtained by the two alignment layers CA1 and CA2 as described previously. In a variant, the crystal cell comprises only a single alignment layer.

The device 10 according to the invention further comprises a set of so-called lateral electrodes extending in a so-called vertical direction Y at right angles to the alignment direction Xa and situated in the plane of the device. A plane of the device is therefore the plane XaY. The lateral electrodes are disposed on a same plane as the pixel electrode. Two lateral electrodes EL$l$ and EL$l'$ are illustrated in FIG. 5.

The lateral electrodes are configured to apply, for each pixel and via at least two lateral electrodes, a so-called acceleration voltage Vacc generating a lateral electrical field E$l$ substantially parallel to the alignment direction Xa, allowing an accelerated return of the liquid crystal molecules to their orientation of rest. The acceleration voltage is applied in a phase called accelerated relaxation phase, when the activation voltage is no longer applied.

Figure 6:
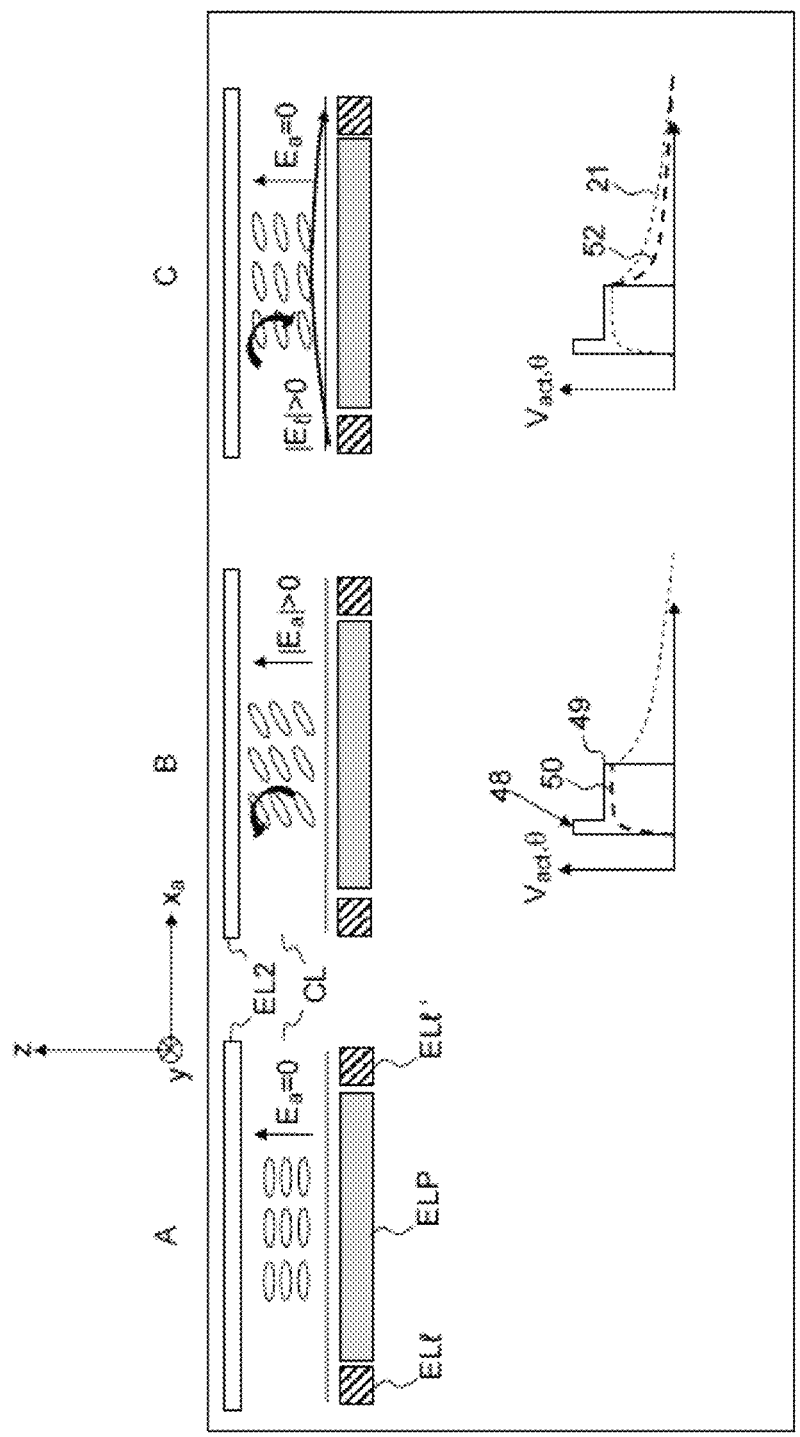
FIG. 6 illustrates the different steps in the addressing of the device according to the invention.

FIG. 6 illustrates the different steps of the addressing of the device 10 according to the invention. In A there is the initial state as described in the state of the art (A0).

In B, during the activation phase, a voltage Vact is applied between ELP and EL2, creating an activation field Ea in the liquid crystal cell, and the molecules are then oriented according to an angle $\theta$ that is a function of the value of Vact (more specifically its absolute value). Thus |Ea|=|Vact|/d, with d the thickness of the layer CL.

The curve 49 illustrates the voltage Vact as a function of the time and the curve 50 the trend of the angle of inclination $\theta$ as a function of time. Preferentially (but that is optional), an overvoltage 48 is added to accelerate the orientation of the molecules.

In C, after the voltage Vact has ceased to be applied, the voltage Vacc is applied via the lateral electrodes EL$l$ and EL$l'$, generating the lateral field E$l$. The curve 52 illustrates the angle of inclination $\theta$ as a function of time, to be compared to the curve 21 of the state of the art described previously. Through the application of the lateral field, the return of the molecules to the initial position is accelerated. In the accelerated relaxation phase, the pixel electrode or electrodes are preferentially connected (set) at high impedance Hi-Z so as not to disturb the establishment of the lateral field.

The acceleration of the return to the initial position of the molecules makes it possible to increase the usage frequency of the LC-SPM.

According to one embodiment, the device 10 according to the invention is configured to operate by reflection, the pixel electrode being at least partially reflecting. According to another embodiment, the device 10 according to the invention is configured to operate by transmission, the pixel electrode being at least partially transparent.

According to a first variant, the lateral electrodes are thin strips disposed on either side of wider strips forming the pixel electrode or electrodes.

Preferentially, one lateral electrode in every two is connected to a first potential Va and one lateral electrode in every two is connected to a second potential Vb.

For a pixel, there are several embodiments depending on the number of lateral electrodes and of pixel electrodes present in a pixel P. Preferentially, within a pixel P, there are equal numbers n of lateral electrodes and of pixel electrodes. According to another embodiment, there are n pixel electrodes and n+1 lateral electrodes.

According to a first mode of implementation, a lateral electrode is common to a vertical row of pixels. According to a second mode of implementation, the lateral electrode or electrodes of a pixel are specific to each pixel. The two modes of implementation are compatible with the different embodiments.

FIG. 7 illustrates a first embodiment with n=1 and FIG. 8 illustrates a second embodiment with n=2, and according to the first mode of implementation. Of course, a greater value of n is also possible. The interest is on reducing the distance between two lateral electrodes so as to apply a lateral field of a higher intensity, but n is limited by the resolution that can be accessed in fabrication (metal track drawing rules) and the diffraction effects.

The device 10 of FIG. 7 thus comprises a single pixel electrode ELP, and that of FIG. 8 comprises two pixel electrodes ELP1 and ELP2. The pixel electrodes are all connected to the at least one control transistor specific to each pixel, so as to be able to apply the activation voltage in the activation phase. The activation voltage is specific to each pixel as a function of the desired angle of orientation: Vact(P). Preferentially during the activation phase, the lateral electrodes are connected at high impedance or to a reference potential.

The lateral electrodes are, here, thin strips which cover an entire vertical row of pixels. Take i as the index of the lateral electrodes EL$\ell$ (i). In the relaxation phase, the acceleration voltage is applied between two adjacent lateral electrodes EL$\ell$ (i), EL$\ell$ (i+1).

For example, the lateral electrodes with an even i (even group) are connected to a potential Va and those with an odd i (odd group) are connected to a potential Vb, so as to apply a voltage Vacc equal to Vb−Va or Va−Vb between two adjacent lateral electrodes EL$\ell$ (i), EL$\ell$ (i+1). In FIG. 7, each lateral electrode is used for the application of the acceleration voltage to two adjacent horizontal pixels. In FIG. 8 only the lateral electrode at the edge of the pixel is used for two adjacent horizontal pixels.

Practically in the first mode of implementation, the even (respectively odd) pixel electrodes are connected to one another at the periphery of the device.

A horizontal row of pixels is called a row and a vertical row of pixels is called a column. According to one embodiment, preferred for an LCD of transmissive type, during the activation phase, the addressing is performed row by row. According to another embodiment, preferred for an LCD of reflective type with a CMOS circuit under the liquid crystal layer, during the activation phase, the addressing is performed in parallel on all the rows.

An example of dimensioning given by way of illustration is, for a pixel of 20 µm, lateral electrodes 0.5 to 1 µm wide, separated from the neighbouring pixel electrode by 0.5 to 1 µm. The width of the pixel electrode is a function of the number n of pixel electrodes in each pixel. Preferentially, the pixel electrode has a width less than or equal to 3µ so as not to reduce the acceleration field.

One advantage of this first mode of implementation is simplified connections for the lateral electrodes. A drawback is that there is little or no activation field applied in the zones of the crystal situated above the lateral electrodes during the activation phase. And therefore the liquid crystal will not be inclined according to the activation voltage in these zones.

Figure 9:
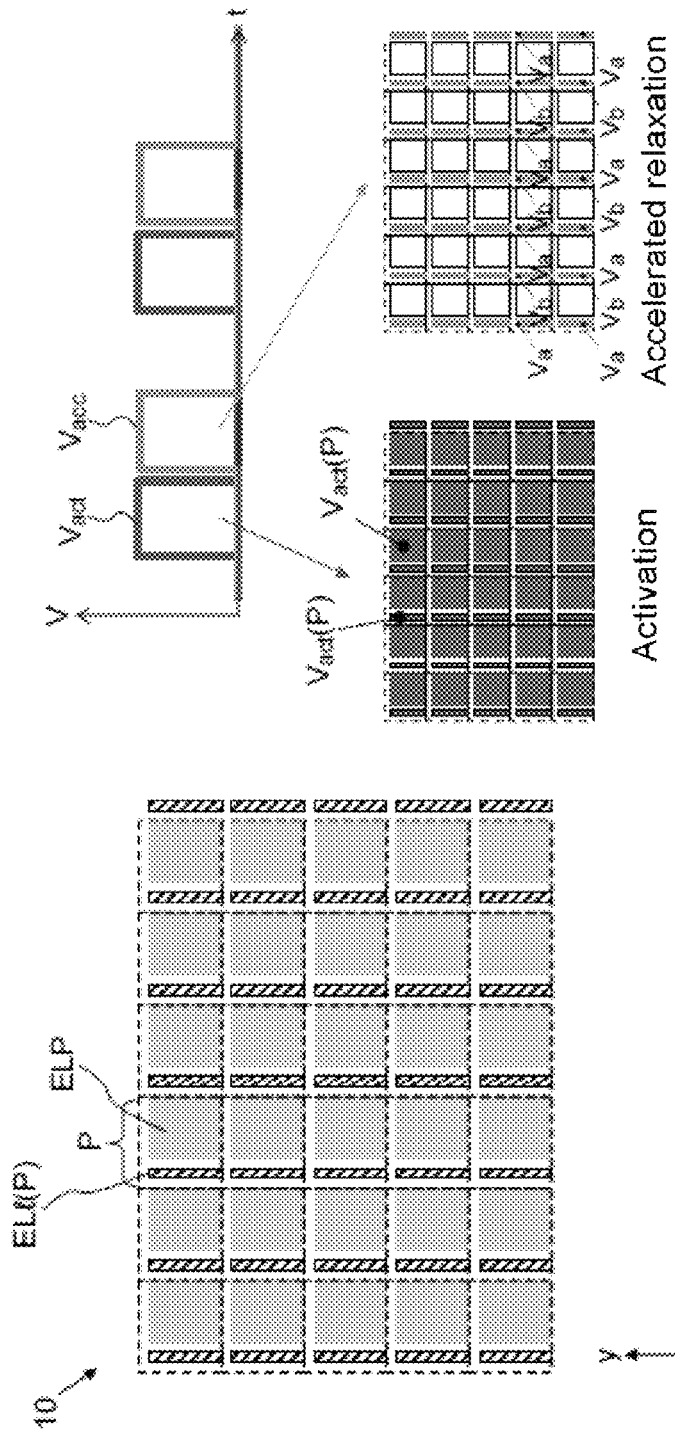
FIG. 9 illustrates a device according to the invention according to a first variant and with one pixel electrode and one lateral electrode per pixel, and according to the second mode of implementation.
Figure 10:
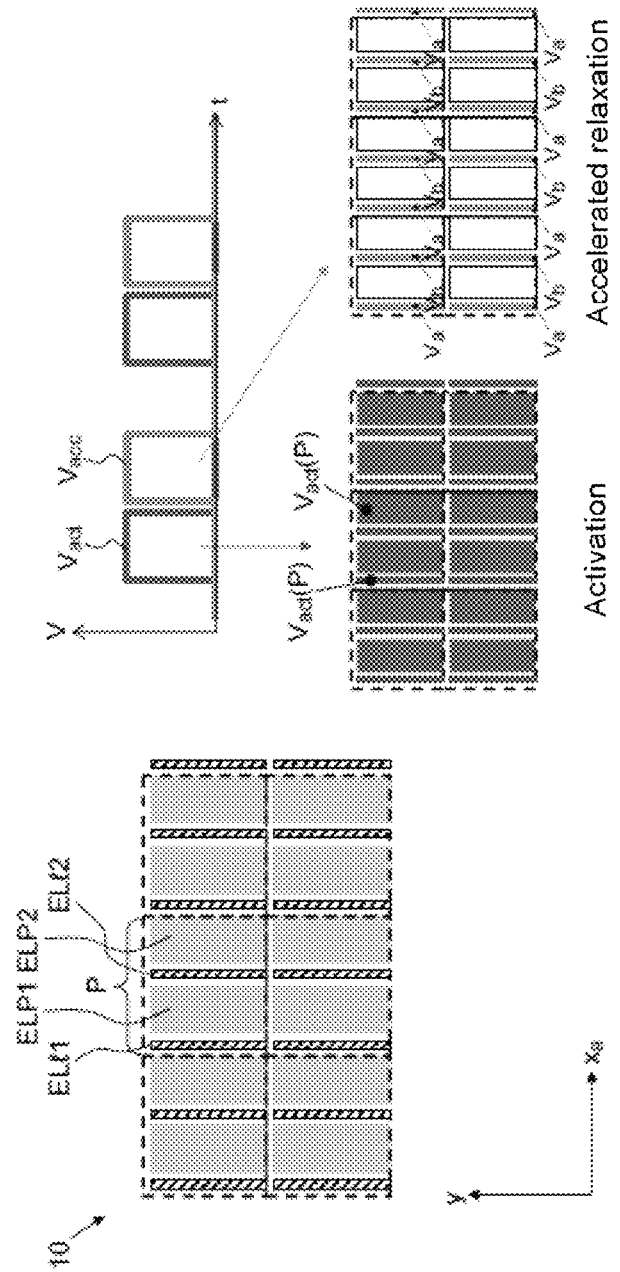
FIG. 10 illustrates a device according to the invention according to the first variant and with two pixel electrodes and two lateral electrodes per pixel, and according to the second mode of implementation.

FIGS. 9 and 10 illustrate devices 10 according to the invention according to the second mode of implementation (the lateral electrodes are individualised, specific to each pixel), FIG. 9 for the n=1 case and FIG. 10 for the n=2 case. In FIG. 9, a pixel P comprises one pixel electrode ELP and one pixel lateral electrode EL$\ell$ (P). In FIG. 10, a pixel P comprises two pixel electrodes ELP1 ELP2 and two pixel lateral electrodes EL$\ell$ 1 and EL$\ell$ 2.

The acceleration voltage is applied between two adjacent lateral electrodes in the horizontal direction.

The advantage of this second mode of implementation is that, in the activation phase, it is possible to apply the activation voltage also to the lateral electrodes of the pixel, as illustrated in FIGS. 9 and 10. All the pixel is then subjected to the activation field, including the liquid crystal zone situated above the lateral electrodes. During the accelerated relaxation phase, the pixel electrodes are connected at high impedance in order not to disturb the establishment of the lateral field.

For this first variant, preferentially the accelerated relaxation phase is performed simultaneously on all the columns.

FIG. 10bis illustrates an example of design of a pixel P for the application of the potentials to the electrodes according to the different phases, for the n=4 case. It implements five switching elements 10, 11, 12, 13, 14. The index i is given to the lateral electrodes of a pixel from 1 to n (or n+1 depending on the embodiment) and two groups are defined, the even electrodes and the odd electrodes.

The element 10 is linked to the pixel electrodes ELP. The elements 11 and 12 are linked to the lateral electrodes intended to be at the potential Va, here the odd electrodes, and the elements 13 and 14 are linked to the lateral electrodes intended to be at the potential Vb, here the even electrodes.

In the activation phase Φact, all the electrodes are connected to the activation voltage Vact(P), the pixel electrodes via the element 10 (control transistor) which applies the activation voltage, the lateral electrodes via the elements 11 and 13. The elements 12 and 14 are open.

In the relaxation phase Φacc, the even electrodes are connected to the voltage Va via the element 12 and the odd electrodes are connected to the voltage Vb via the element 14, and the other elements are open. The element 10 is open and the pixel electrodes are then in high impedance state.

Thus, the addressing circuit of the modulation device according to the invention comprises, for the addressing of a pixel, at least five associated switching elements, namely: at least three (10, 11, 13) for applying the activation voltage (in combination with EL2) during the activation phase, and at least two (12, 14) for applying the acceleration voltage in the accelerated relaxation phase. The switching element 10 includes the at least one control transistor.

The switching elements or switches are composed, for example, of an Nmos transistor, which is in the on state on a high gate command. They can also be composed of two N and P transistors in parallel (in this case, there is a need to generate the complementary commands Φactbar and Φaccbar for the driving of the PMOS). Thus, each switching element comprises at least one transistor.

One drawback with this first variant is that, in the accelerated relaxation phase, the liquid crystal zone situated above the lateral electrodes is not subjected to the lateral field $E\ell$, which is very weak or even nil in this zone.

Figure 11:
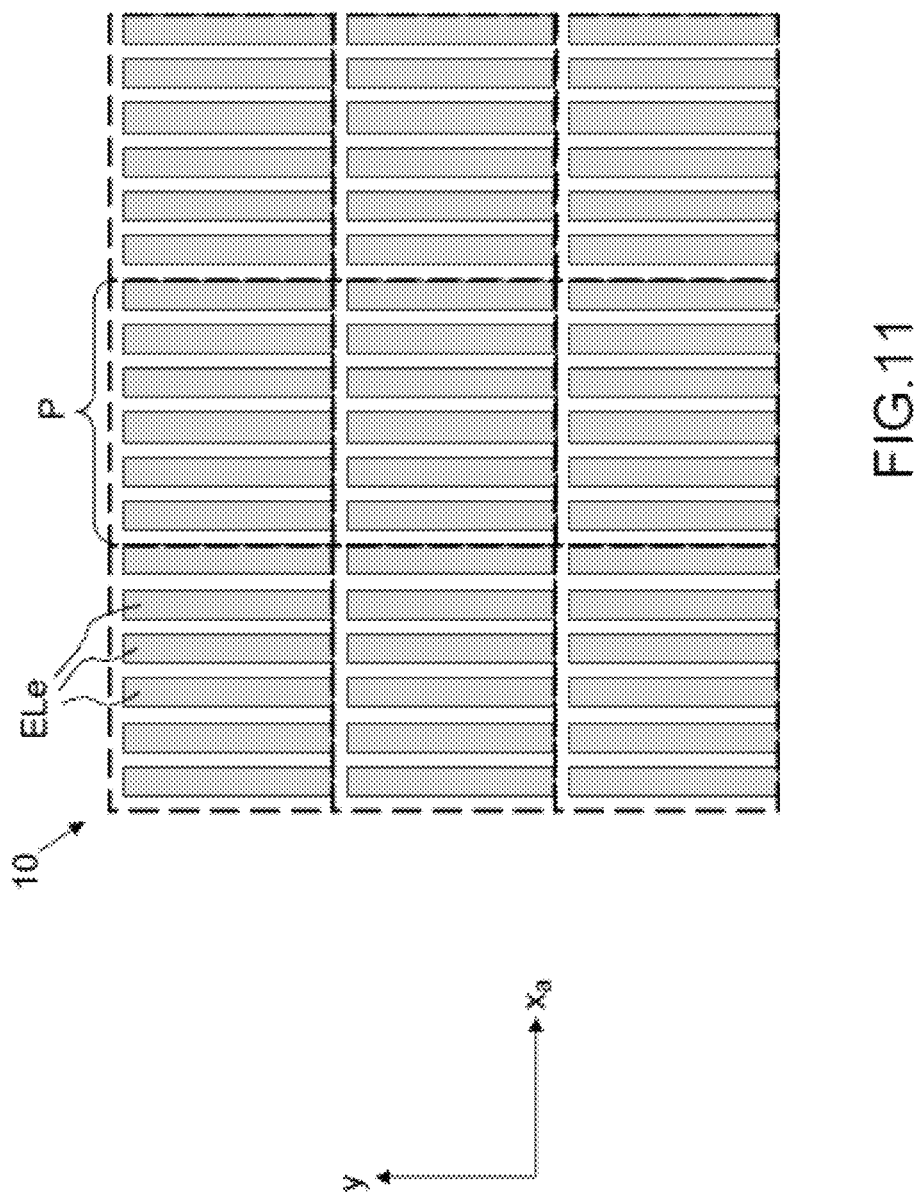
FIG. 11 illustrates a device according to the invention according to a second variant, in which, for each pixel, the pixel electrodes and the lateral electrodes are combined.

According to a second variant illustrated in FIG. 11, for each pixel the pixel electrodes and the lateral electrodes are combined and called elementary electrodes ELe:

$$ELP = EL\ell = ELe$$

These electrodes are specific to each pixel P.

The elementary electrodes ELe then take the form of a strip of substantially identical dimensions and extend in the vertical direction Y. The index k is given to these elementary electrodes of the device 10 according to the invention, ELe(k). In this variant, it is the same electrodes which participate in the activation phase and in the accelerated relaxation phase.

Figure 12:
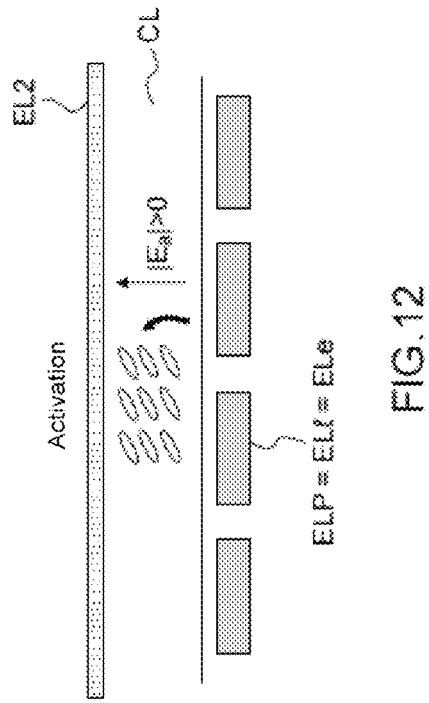
FIG. 12 illustrates the activation phase of the device according to the second variant of the invention.

In the activation phase, the elementary electrodes ELe are configured to apply, in combination with the second electrode EL2, a same activation voltage Vact(P) specific to each pixel P, as FIG. 12 illustrates.

Figure 13:
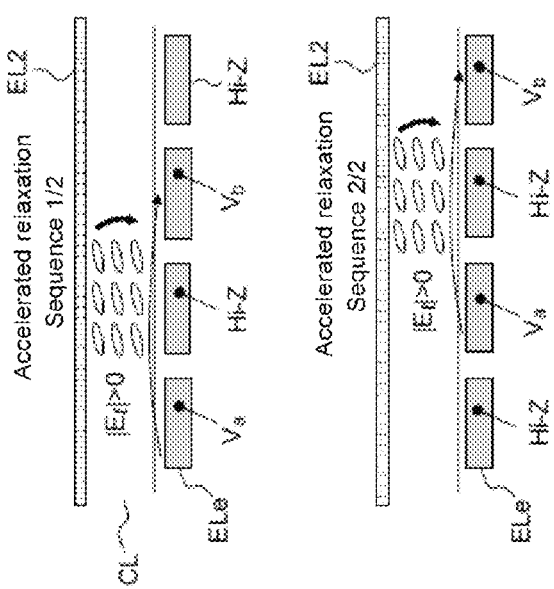
FIG. 13 illustrates the accelerated relaxation phase of the device according to the second variant of the invention.

The elementary electrodes are indexed k from 1 to p. The p elementary electrodes are divided up into a first group and a second group of one strip in every two, i.e. ELe (k even) and ELe (k odd). The accelerated relaxation phase comprises two sequences, as FIG. 13 illustrates.

The first group of elementary electrodes is configured to apply an acceleration voltage in the first sequence of the accelerated relaxation phase, the strips of the second group being configured at high impedance during this first sequence. Then, in the second sequence of the accelerated relaxation phase, the second group is configured to apply the acceleration voltage, and the strips of the first group are configured at high impedance.

This second variant presents the advantage, with respect to the first variant, of allowing the application of a lateral field above all the lateral electrodes, by virtue of the two sequences. An elementary electrode used as lateral electrode in one sequence will be disposed between two lateral electrodes during the other sequence.

FIG. 14 illustrates an exemplary embodiment with 6 electrodes per pixel.

In the first sequence, the electrodes ELe(1), ELe(3), ELe(5), ELe(7), ELe(9) (k odd) apply the potential Vacc=Va−Vb or Vb−Va. For that, the electrodes 1, 5, 9 are connected to the potential Va (dark grey) and the electrodes 3, 7, etc. are connected to Vb (light grey). Thus, with the electrode 7 of the neighbouring pixel at Vb, the pixel edge electrode ELe(6) is indeed subjected to the acceleration potential. The electrodes ELe(2), ELe(4), etc. (k even) are connected at high impedance (white).

In the second sequence, the even electrodes are connected to Va or Vb and the odd electrodes are at high impedance. The electrodes ELe(2), ELe(6), etc. are at Va and the electrodes ELe(4), ELe(8), etc. are at Vb.

Figure 15:
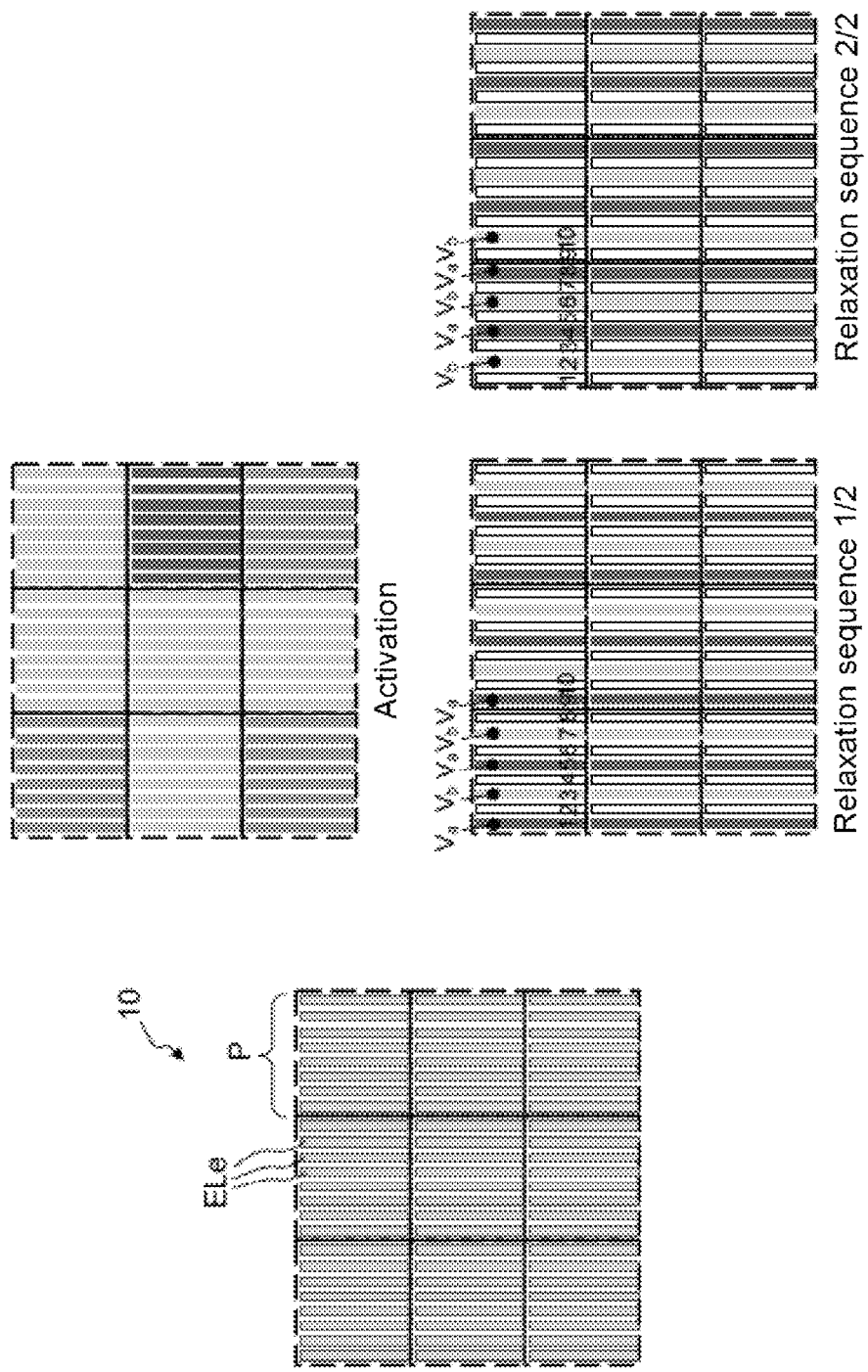
FIG. 15 illustrates an exemplary embodiment of the second variant with 8 electrodes per pixel.

FIG. 15 illustrates an exemplary embodiment with 8 electrodes per pixel. The advantage with 8 electrodes per pixel is that this configuration is regular, that is to say that the first electrodes of two neighbouring pixels (1 and 9 in FIG. 15) are controlled in the same way, i.e. with the same potential. Thus, preferentially, the number p of electrodes ELe per pixel is a multiple of 4 (2 sequences×2).

This operation can be generalised to a relaxation phase with m sequences. For that, m groups of one strip in every m are defined and the relaxation phase comprises m sequences. Preferentially, the number of electrodes ELe per pixel is a multiple of 2 m (m sequences×2).

The first group of elementary electrodes is configured to apply an acceleration voltage in the first sequence of the accelerated relaxation phase, the strips of the other groups being configured at high impedance during this first sequence. Then, in a second sequence of the accelerated relaxation phase, the second group is configured to apply the acceleration voltage, and the strips of the other groups are configured at high impedance, and so on up to the mth sequence.

Typically, 3 or 4 sequences are not exceeded, in order to maintain a sufficiently short distance between two electrodes ELe(k)/Ele(k+m) applying the acceleration voltage in a sequence, respectively via the potentials Va and Vb.

Figure 16:
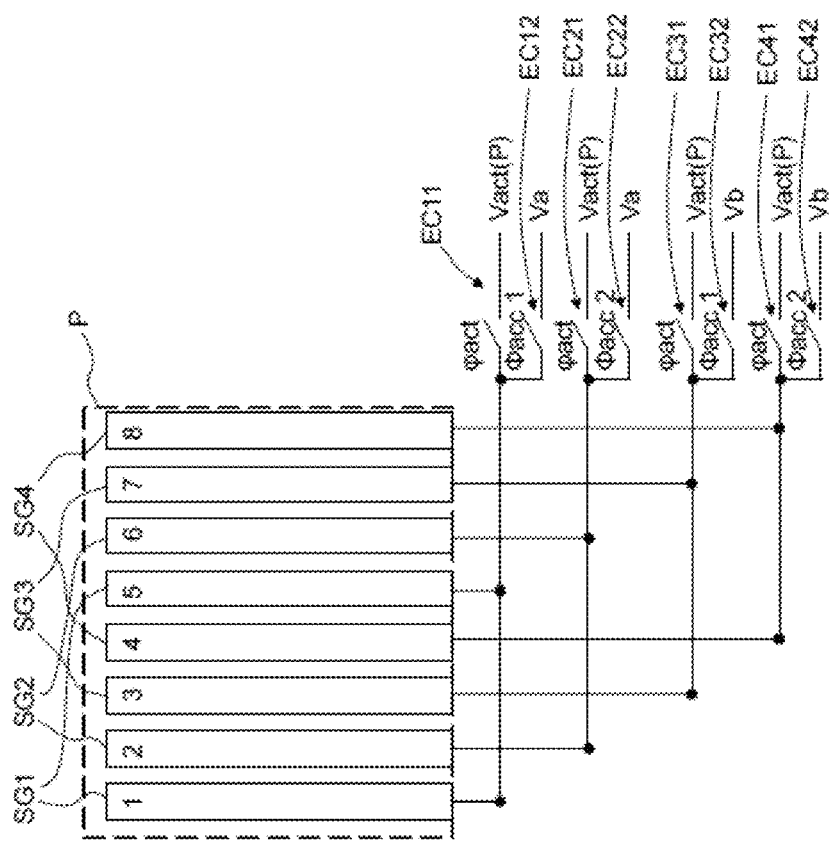
FIG. 16 illustrates a first example of design for the addressing of a pixel for the case of 8 elementary electrodes.

FIG. 16 illustrates a first example of design for the addressing of a pixel P for the case of p=8 elementary electrodes and 2 sequences. Here 4 subgroups SG1 to SG4 (index j) each of two electrodes ELe(k) ELe(k+4) need to be defined. For p elementary electrodes per pixel and m addressing sequences, there will be 2 m subgroups. Each subgroup SGj is linked to two switching elements ECj1, ECj2, i.e. 4 m switching elements in total per pixel, 2 m for the application of the activation voltage and 2 m for the application of the acceleration voltage.

The addressing principle is of the same type as that illustrated in FIG. 10bis. In the activation phase Φact, all the elementary electrodes are linked to Vact(P) via EC11, EC21, EC31, EC41 (4=2 m switching elements for applying the activation voltage), the other switching elements are open. A switching element for applying the activation voltage comprises at least one control transistor as defined previously. In a first accelerated relaxation sequence Φacc1, the first group is connected to Va via EC12 and the third group is connected to Vb via EC32. Then, in the second accelerated relaxation sequence Φacc2, the second group is connected to Va via EC22 and the fourth group is connected to Vb via EC42 (4=2 m switching elements for applying the acceleration voltage).

Figure 17:
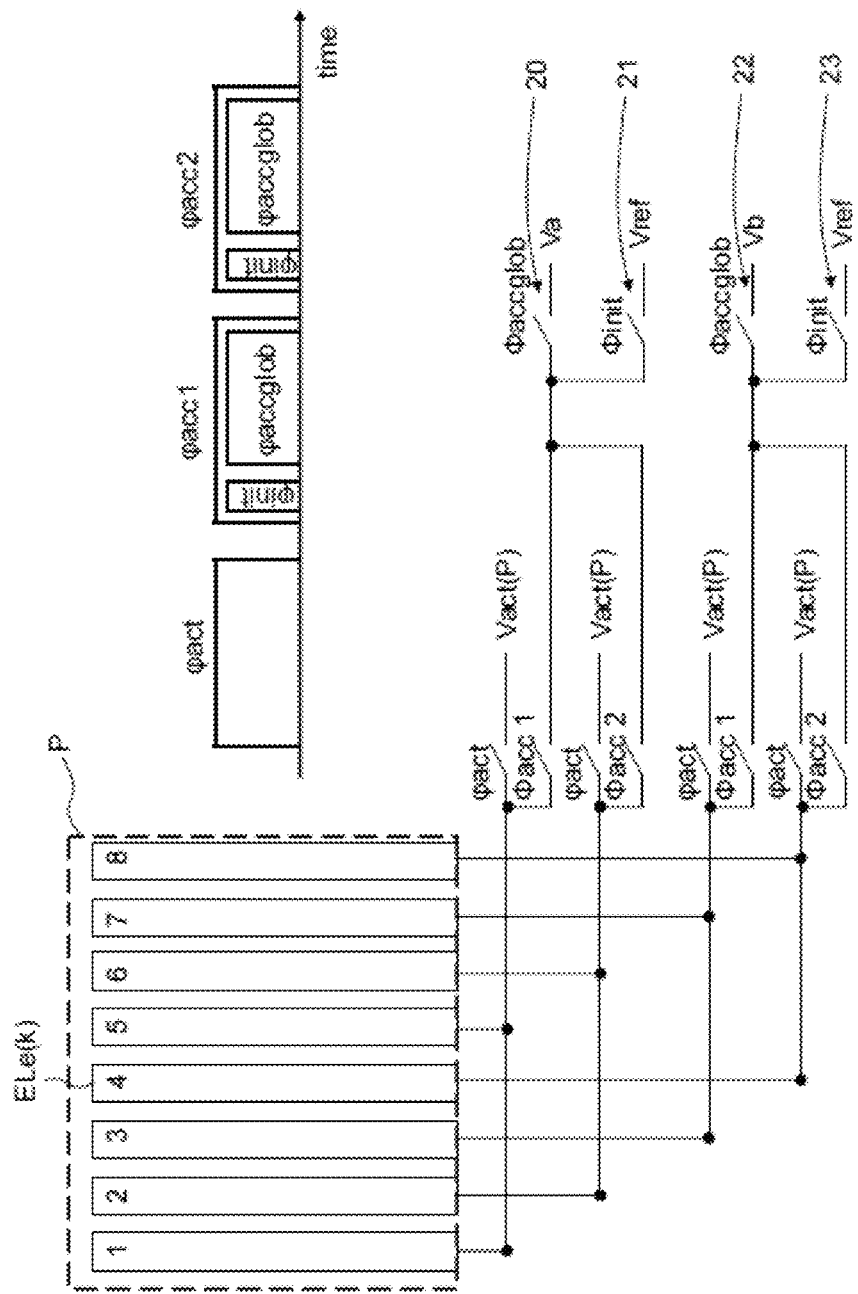
FIG. 17 illustrates a second example of design for the addressing of a pixel for the case of 8 elementary electrodes.

FIG. 17 illustrates a second example of design for the addressing of a pixel P for the case of p=8 elementary electrodes and two sequences m=2. In this example, the electrodes are very rapidly refreshed at a reference potential Vref before they are at high impedance to erase the residual charge stored on this electrode (in a time very much less than the liquid crystal switchover time). For that, the two switches intended to apply a same potential respectively during the first and second sequences of the accelerated acceleration phase are connected either to Va (respectively Vb) or to Vref via two additional switching elements 20, 21 (respectively 22, 23). The application of the potential Vref is performed in a presequence Φinit, before each sequence of the relaxation phase, as illustrated in FIG. 17. The element 20 allows the application of the potential Va in the two sequences Φacc1+Φacc2 (Φaccglob).

Thus, the addressing circuit of the matrix of pixels comprises, to perform the addressing with m sequences, at least 4 m switching elements in all. When each switching element is equal to a transistor, there are therefore 2 m transistors for applying the activation voltage (in combination with EL2), these transistors being called control transistor, and at least 2 m transistors for applying the acceleration voltage: m transistors for applying Va to m subgroups and m transistors for applying Vb to the other m subgroups.

Figure 1:
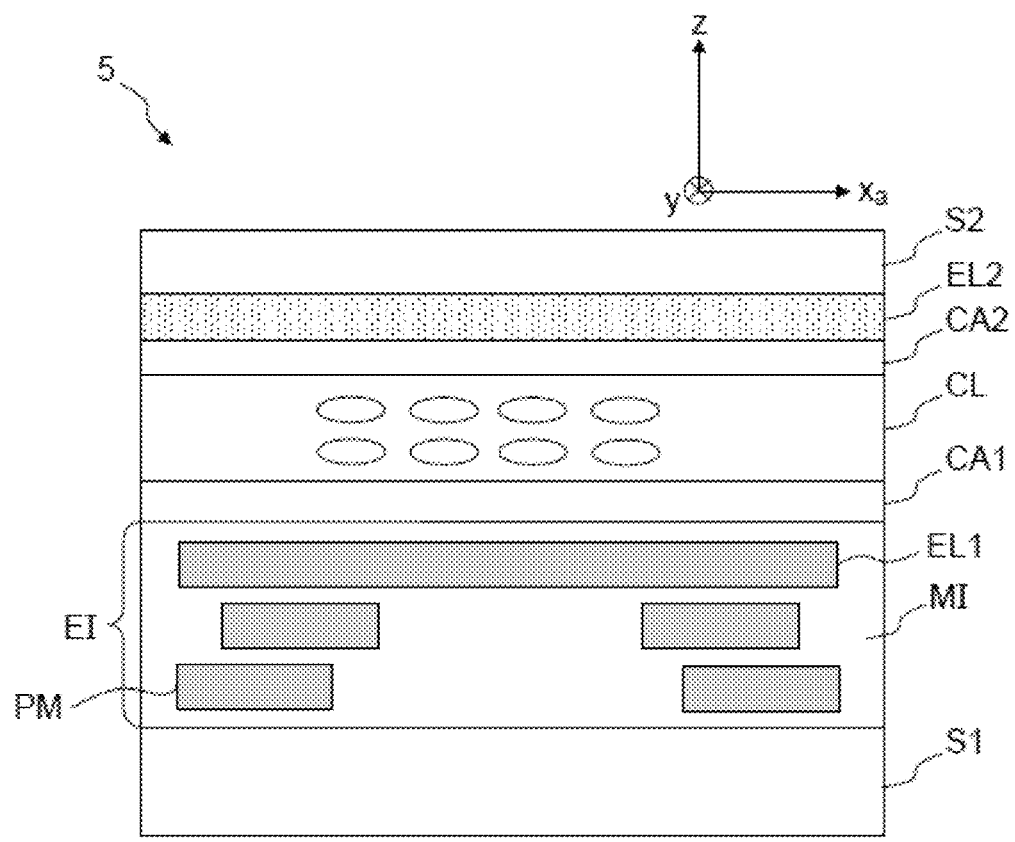
FIG. 1, already cited, illustrates the structure of a liquid crystal phase modulator (LC-SPM) of ECB type.
Figure 2:
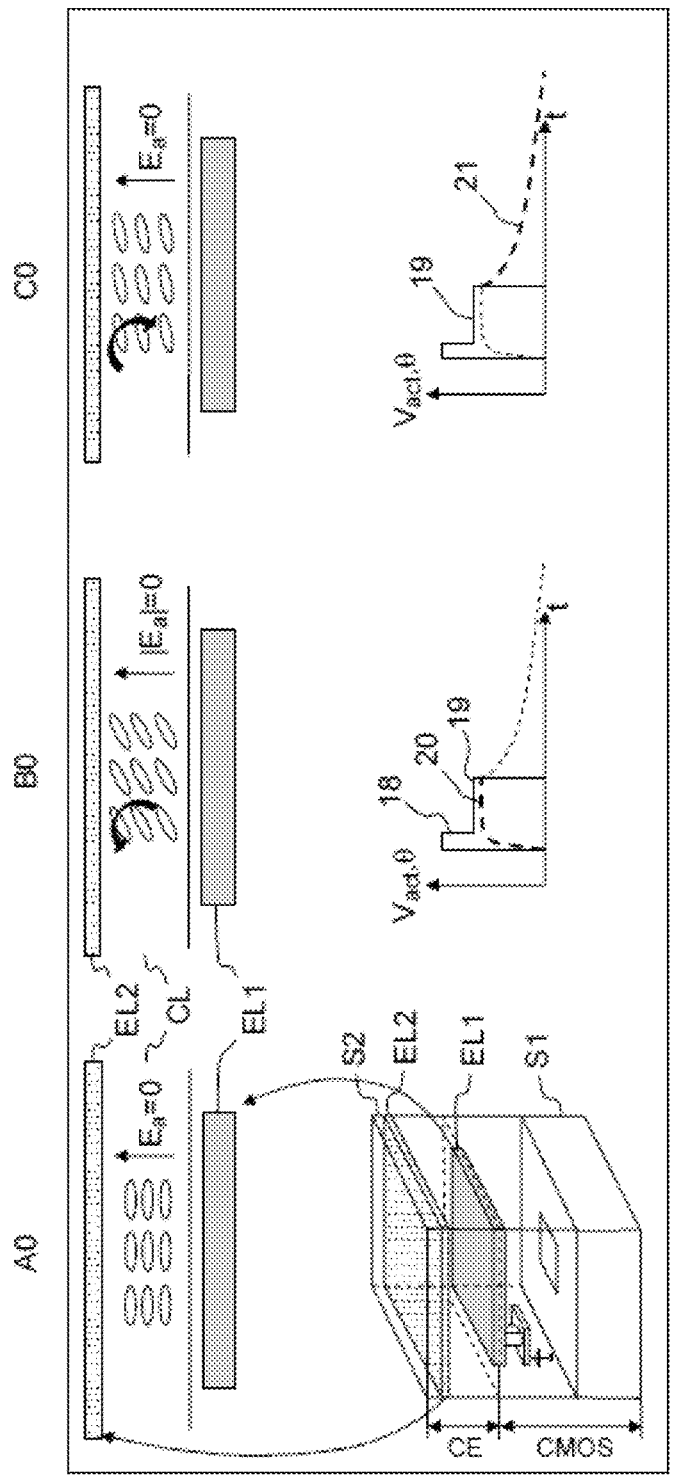
FIG. 2, already cited, illustrates the operation of a liquid crystal phase modulator of ECB type.
Figure 3:
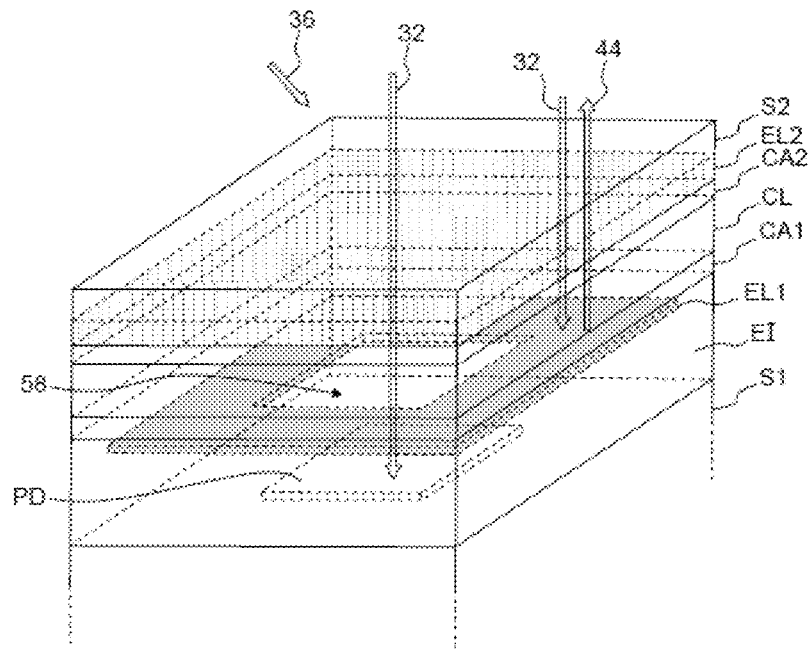
FIG. 3, already cited, illustrates an LC-SPM device hybridised with a detection function for wavefront measurement and control according to the state of the art, in perspective.
Figure 4:
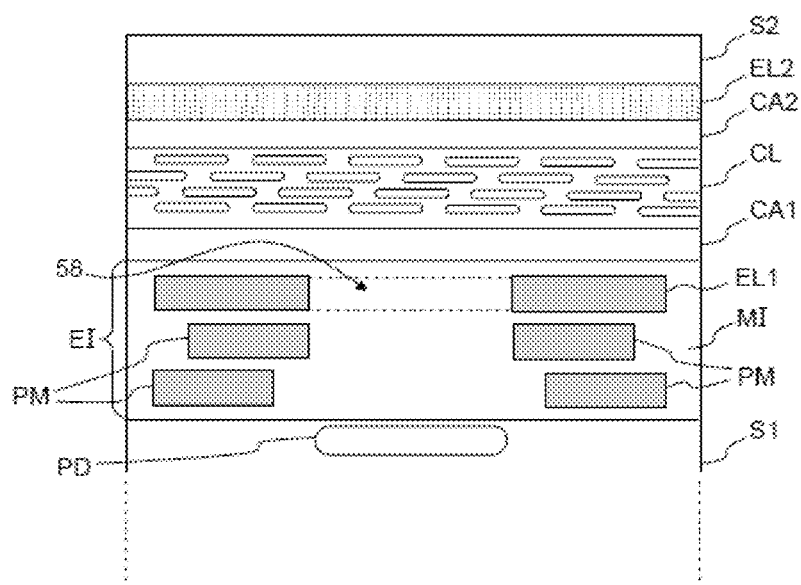
FIG. 4, already cited, illustrates an LC-SPM device hybridised with a detection function for wavefront measurement and control according to the state of the art, in profile.
Figure 18:
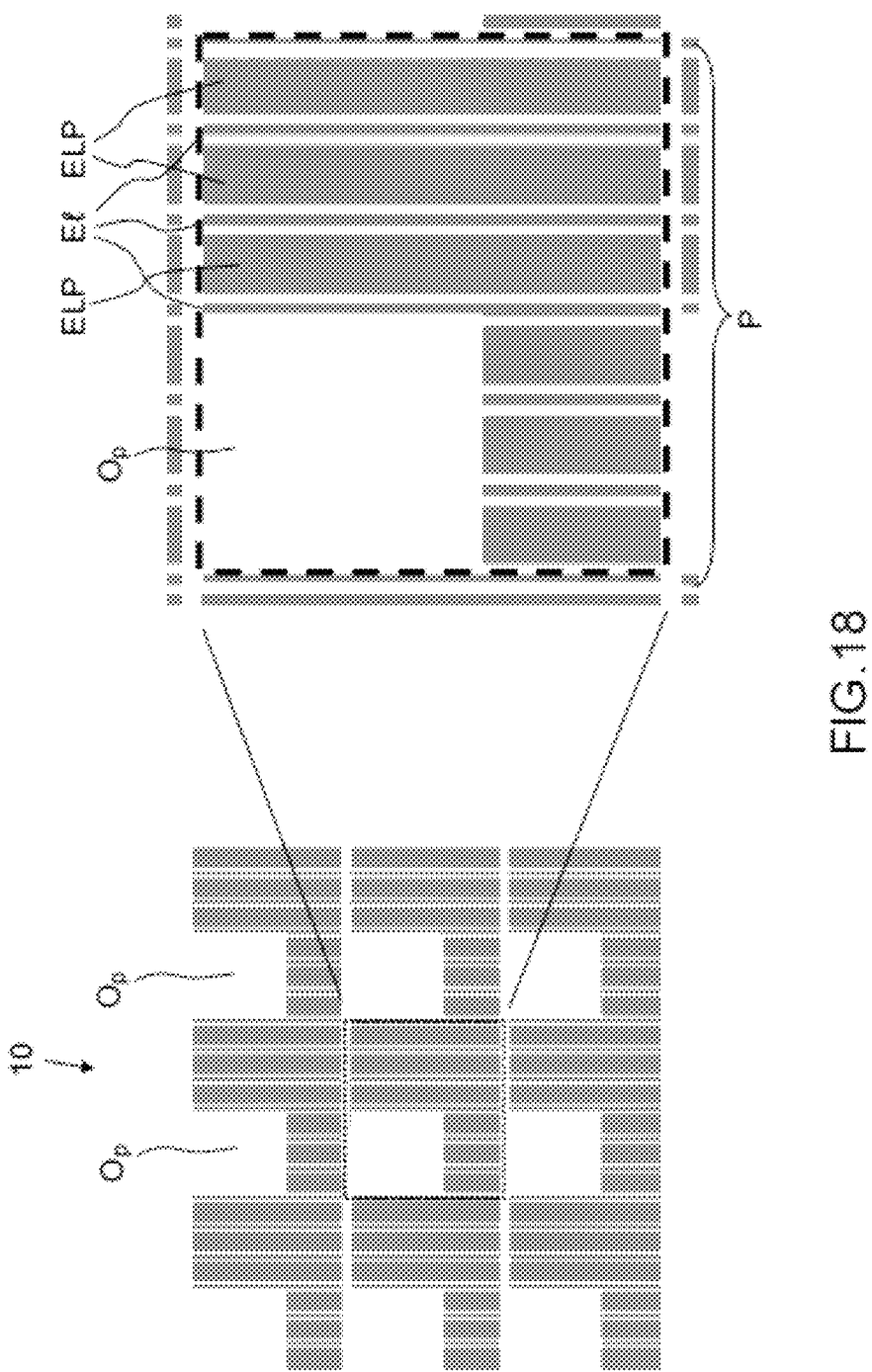
FIG. 18 illustrates an embodiment of the device according to the first variant of the invention intended to be incorporated in a wavefront measurement and control system as described in FIGS. 3 and 4.
Figure 19:
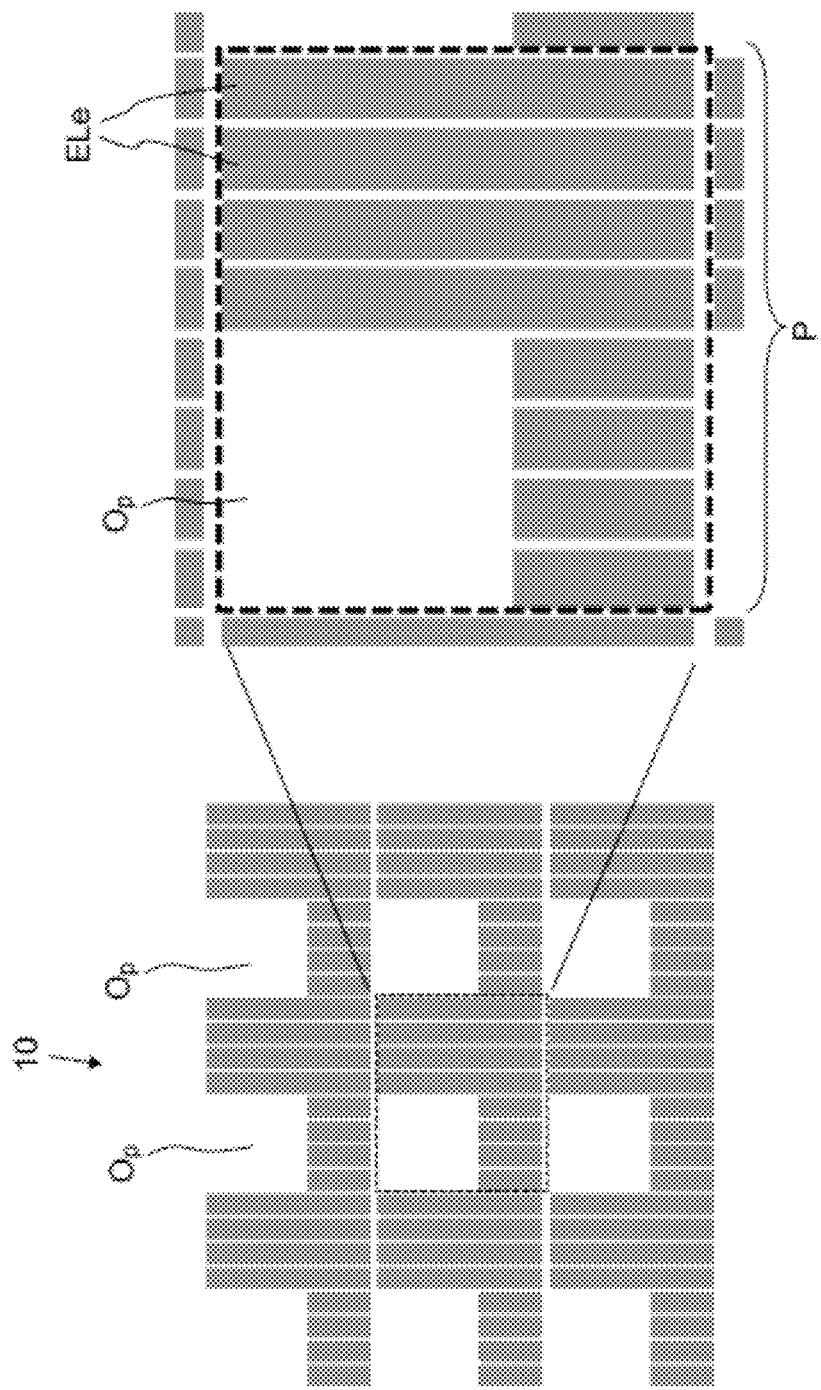
FIG. 19 describes an embodiment of the device according to the second variant of the invention intended to be incorporated in a wavefront measurement and control system as described in FIGS. 3 and 4.

According to one embodiment, the phase modulation device 10 according to the invention is intended to be incorporated in a wavefront measurement and control system as described in FIGS. 3 and 4, in order to increase its operating frequency. For that, the device according to the invention operates by reflection, the pixel electrode is at least partially reflecting and has an aperture Op as illustrated in FIG. 18 for the first variant (with 6 pixel electrodes) and FIG. 19 for the second variant (with 8 elementary electrodes per pixel) of device 10 according to the invention.

The device 10 is then of LCOS type with a pixel addressing circuit that is at least partially incorporated in a substrate S1, the substrate further comprising a plurality of detection elements PD disposed opposite said apertures (see FIGS. 3, 4).

According to one embodiment, the device according to the invention comprises an opaque matrix which delimits the pixels, called "black matrix" and known to the person skilled in the art. This "black matrix" makes it possible for example to correct the edge effects between pixels in the activation phase. According to another aspect, the invention relates to a method for addressing a light beam phase modulation device 10 as described previously.

The method comprises an activation phase in which, for each pixel, the activation voltage Vact is applied between the at least one pixel electrode and the second electrode.

The method also comprises an accelerated relaxation phase in which the activation voltage ceases to be applied, then, for each pixel, an acceleration voltage Vacc is applied via at least two lateral electrodes, generating a lateral electrical field E$\ell$ substantially parallel to the alignment direction Xa, with a vector allowing an accelerated return of the liquid crystal molecules to their orientation of rest.

According to one embodiment, a lateral electrode is common to a vertical row of the pixels and:
- during the activation phase, the lateral electrodes are connected at high impedance or to a reference potential,
- during the accelerated relaxation phase, the acceleration voltage is applied via two adjacent lateral electrodes disposed on either side of the at least one pixel electrode.

According to another embodiment, there is at least one lateral electrode specific to each pixel and:
- during the activation phase, the activation voltage is applied between the lateral electrodes and the second electrode,
- during the accelerated relaxation phase, the acceleration voltage is applied via two adjacent lateral electrodes disposed on either side of the at least one pixel electrode.

According to another embodiment, for each pixel the pixel electrodes and the lateral electrodes are combined and called elementary electrodes. The elementary electrodes take the form of a strip of substantially identical dimensions and extend in the vertical direction, and the elementary electrodes are divided up into a first group and a second group of one strip in every two, and:
- during the activation phase, the activation voltage is applied via the elementary electrodes in combination with the second electrode, and
- the accelerated relaxation phase comprises two sequences:
  - a first sequence in which the acceleration voltage is applied via the first group of elementary electrodes, the elementary electrodes of the second group being connected at high impedance or to a reference potential,
  - a second sequence in which the acceleration voltage is applied via the second group of elementary electrodes, the elementary electrodes of the first group being connected at high impedance or to a reference potential.

The invention claimed is:

1. A device for modulating a phase of a light beam, comprising:
   a matrix of elementary cells, called pixels, coupled to a circuit for addressing said pixels, each elementary cell comprising a liquid crystal layer (CL) and, on either side of said liquid crystal layer, at least one first electrode (ELP) called pixel electrode controlled by at least one control transistor coupled to said addressing circuit, and a second electrode (EL2) that is transparent and common to all the cells,
   the liquid crystal being composed of molecules having a natural orientation of rest in a plane of said device and in a so-called horizontal direction of alignment (Xa) oriented along a so-called horizontal row of pixels, and in the absence of voltage between the at least one pixel electrode and the second electrode, and another orientation outside of said plane of said device in the presence of voltage between the at least one pixel electrode and the second electrode, called activation voltage (Vact), said activation voltage being applied in a phase of activation of the liquid crystal molecules, a phase shift of the light beam being a function of a value of the applied activation voltage;
   the device further comprising a set of so-called lateral electrodes extending in a so-called vertical direction (Y) at right angles to said alignment direction (Xa), disposed on a same plane as the pixel electrode and configured to apply, for each pixel and via at least two lateral electrodes, a so-called acceleration voltage (Vacc) generating a lateral electrical field (Era) substantially parallel to said alignment direction, in a vector allowing an accelerated return of the liquid crystal molecules to their orientation of rest, said acceleration voltage being configured to be applied in a phase called accelerated relaxation phase, when the activation voltage is no longer applied.

2. The device according to claim 1, wherein the lateral electrodes are thin strips disposed on either side of wider strips forming the pixel electrode or electrodes and wherein the acceleration voltage is applied between two adjacent lateral electrodes (EL1(i), EL1(i+1)), and wherein, during the accelerated relaxation phase, one lateral electrode in every two is connected to a first potential (Va) and one lateral electrode in every two is connected to a second potential (Vb), to apply the acceleration voltage.

3. The device according to claim 1, wherein the lateral electrodes are thin strips disposed on either side of wider strips forming the pixel electrode or electrodes and wherein the acceleration voltage is applied between two adjacent lateral electrodes (EL1(i), EL1(i+1)), and wherein each pixel comprises a single pixel electrode and a single lateral electrode.

4. The device according to claim 1, wherein the lateral electrodes are thin strips disposed on either side of wider strips forming the pixel electrode or electrodes and wherein the acceleration voltage is applied between two adjacent lateral electrodes (EL1(i), EL1(i+1)), and wherein each pixel comprises n pixel electrodes forming n strips oriented in the vertical direction and n lateral electrodes.

5. The device according to claim 1, wherein a lateral electrode is common to a vertical row of pixels.

6. The device according to claim 1, wherein the lateral electrode or electrodes of a pixel are specific to each pixel.

7. The device according to claim 6, wherein, for each pixel, the lateral electrodes are further configured to apply, in combination with the second electrode, the activation voltage to said pixel during the activation phase.

8. The device according to claim 7, wherein the addressing circuit comprises, for the addressing of a pixel, at least five switching elements, at least three of them for applying said activation voltage, including the at least one control transistor, and at least two of them for applying said acceleration voltage.

9. The device according to claim 1, wherein, for each pixel, the pixel electrodes and the lateral electrodes are combined and called elementary electrodes, said elementary electrodes taking the form of a strip of substantially identical dimensions and extending in the vertical direction, said elementary electrodes being divided up into a first group and a second group of one strip in every two,
- said elementary electrodes being configured to apply, in combination with the second electrode, a same activation voltage during the activation phase,
- the first group of elementary electrodes being configured to apply an acceleration voltage during a first sequence of the accelerated relaxation phase, the strips of the second group being configured at high impedance or to a reference potential,
- the second group being configured to apply an acceleration voltage during a second sequence of the accelerated relaxation phase, the strips of the first group being configured at high impedance or to a reference potential, and
- wherein the number p of elementary electrodes per pixel is a multiple of 4.

10. The device according to claim 1, wherein, for each pixel, the pixel electrodes and the lateral electrodes are combined and called elementary electrodes, said elementary electrodes taking the form of a strip of substantially identical dimensions and extending in the vertical direction, said elementary electrodes being divided up into a first group and a second group of one strip in every two,
- said elementary electrodes being configured to apply, in combination with the second electrode, a same activation voltage during the activation phase,
- the first group of elementary electrodes being configured to apply an acceleration voltage during a first sequence of the accelerated relaxation phase, the strips of the second group being configured at high impedance or to a reference potential,
- the second group being configured to apply an acceleration voltage during a second sequence of the accelerated relaxation phase, the strips of the first group being configured at high impedance or to a reference potential, and
- wherein the addressing circuit comprises, for the addressing of a pixel, at least four switching elements for applying said activation voltage, including the at least one control transistor, and at least four switching elements for applying said acceleration voltage.

11. The device according to claim 1 operating in reflection mode and further allowing a measurement of the wavefront of said incident beam, wherein the at least partially reflecting pixel electrode has an aperture (Op), the addressing circuit of the pixels being at least partially disposed behind said matrix and incorporated in a substrate, said substrate further comprising a plurality of detection elements (PD) disposed opposite said apertures.

12. A method for addressing a light beam phase modulation device, the addressing device comprising a matrix of elementary cells, called pixels, coupled to an addressing circuit for said pixels, each elementary cell comprising a liquid crystal layer (CL) and, on either side of said liquid crystal layer, at least one first electrode (ELP) called pixel electrode controlled by a control transistor coupled to said addressing circuit, and a second electrode (EL2) that is transparent and common to all the cells, the liquid crystal being composed of molecules that have a natural orientation of rest in a plane of said layer in a so-called horizontal alignment direction (Xa) oriented along a so-called horizontal row of pixels, and in the absence of voltage between the pixel electrode and the second electrode, and another orientation outside of said plane of said layer, in the presence of voltage between the pixel electrode and the second electrode, called activation voltage (Vacc), the device further comprising a set of so-called lateral electrodes extending in a so-called vertical direction (Y) at right angles to said alignment direction (Xa) and disposed on a same plane as the pixel electrode, the method comprising:
- an activation phase wherein, for each pixel, said activation voltage is applied,
- an accelerated relaxation phase wherein, for each pixel, a so-called acceleration voltage (Vacc) is applied, via at least two lateral electrodes, generating a lateral electrical field (Era) substantially parallel to said alignment direction, in a vector allowing an accelerated return of the liquid crystal molecules to their orientation of rest, said acceleration voltage being applied when the activation voltage is no longer applied.

13. The method according to claim 12, wherein a lateral electrode is common to a vertical row of the pixels and wherein:
- during the activation phase, the lateral electrodes are connected at high impedance or to a reference potential,
- during the accelerated relaxation phase, the acceleration voltage is applied via two adjacent lateral electrodes disposed on either side of the at least one pixel electrode.

14. The method according to claim 12, wherein each pixel comprises at least one lateral electrode specific to each pixel, and wherein:
- during the activation phase, the activation voltage is applied between a lateral electrode and the second electrode,
- during the accelerated relaxation phase, the acceleration voltage is applied via two adjacent lateral electrodes disposed on either side of the at least one pixel electrode.

15. A device for modulating a phase of a light beam, comprising:
- a matrix of elementary cells, called pixels, coupled to a circuit for addressing said pixels, each elementary cell comprising a liquid crystal layer (CL) and, on either side of said liquid crystal layer, at least one first electrode (ELP) called pixel electrode controlled by at least one control transistor coupled to said addressing circuit, and a second electrode (EL2) that is transparent and common to all the cells,
- the liquid crystal being composed of molecules having a natural orientation of rest in a plane of said device and in a so-called horizontal direction of alignment (Xa) oriented along a so-called horizontal row of pixels, and in the absence of voltage between the at least one pixel electrode and the second electrode, and another orientation outside of said plane of said device in the presence of voltage between the at least one pixel electrode and the second electrode, called activation voltage (Vact), said activation voltage being applied in a phase of activation of the liquid crystal molecules,
- the device further comprising a set of so-called lateral electrodes extending in a so-called vertical direction (Y) at right angles to said alignment direction (Xa), disposed on a same plane as the pixel electrode and configured to apply, for each pixel and via at least two lateral electrodes, a so-called acceleration voltage (Vacc) generating a lateral electrical field (Era) substantially parallel to said alignment direction, in a vector allowing an accelerated return of the liquid crystal molecules to their orientation of rest, said acceleration voltage being configured to be applied in a phase called accelerated relaxation phase, when the activation voltage is no longer applied, wherein the lateral electrodes are thin strips disposed on either side of wider strips forming the pixel electrode or electrodes and wherein the acceleration voltage is applied between two adjacent lateral electrodes (EL1(i), EL1(i+1)).

16. A device for modulating a phase of a light beam, comprising:
    a matrix of elementary cells, called pixels, coupled to a circuit for addressing said pixels, each elementary cell comprising a liquid crystal layer (CL) and, on either side of said liquid crystal layer, at least one first electrode (ELP) called pixel electrode controlled by at least one control transistor coupled to said addressing circuit, and a second electrode (EL2) that is transparent and common to all the cells,
    the liquid crystal being composed of molecules having a natural orientation of rest in a plane of said device and in a so-called horizontal direction of alignment (Xa) oriented along a so-called horizontal row of pixels, and in the absence of voltage between the at least one pixel electrode and the second electrode, and another orientation outside of said plane of said device in the presence of voltage between the at least one pixel electrode and the second electrode, called activation voltage (Vact), said activation voltage being applied in a phase of activation of the liquid crystal molecules,
    the device further comprising a set of so-called lateral electrodes extending in a so-called vertical direction (Y) at right angles to said alignment direction (Xa), disposed on a same plane as the pixel electrode and configured to apply, for each pixel and via at least two lateral electrodes, a so-called acceleration voltage (Vacc) generating a lateral electrical field (Era) substantially parallel to said alignment direction, in a vector allowing an accelerated return of the liquid crystal molecules to their orientation of rest, said acceleration voltage being configured to be applied in a phase called accelerated relaxation phase, when the activation voltage is no longer applied,
    wherein, for each pixel, the pixel electrodes and the lateral electrodes are combined and called elementary electrodes, said elementary electrodes taking the form of a strip of substantially identical dimensions and extending in the vertical direction, said elementary electrodes being divided up into a first group and a second group of one strip in every two,
    said elementary electrodes being configured to apply, in combination with the second electrode, a same activation voltage during the activation phase,
    the first group of elementary electrodes being configured to apply an acceleration voltage during a first sequence of the accelerated relaxation phase, the strips of the second group being configured at high impedance or to a reference potential,
    the second group being configured to apply an acceleration voltage during a second sequence of the accelerated relaxation phase, the strips of the first group being configured at high impedance or to a reference potential.

17. A method for addressing a light beam phase modulation device, the addressing device comprising a matrix of elementary cells, called pixels, coupled to an addressing circuit for said pixels, each elementary cell comprising a liquid crystal layer (CL) and, on either side of said liquid crystal layer, at least one first electrode (ELP) called pixel electrode controlled by a control transistor coupled to said addressing circuit, and a second electrode (EL2) that is transparent and common to all the cells, the liquid crystal being composed of molecules that have a natural orientation of rest in a plane of said layer in a so-called horizontal alignment direction (Xa) oriented along a so-called horizontal row of pixels, and in the absence of voltage between the pixel electrode and the second electrode, and another orientation outside of said plane of said layer, in the presence of voltage between the pixel electrode and the second electrode, called activation voltage (Vacc), the device further comprising a set of so-called lateral electrodes extending in a so-called vertical direction (Y) at right angles to said alignment direction (Xa) and disposed on a same plane as the pixel electrode, the method comprising:
    an activation phase wherein, for each pixel, said activation voltage is applied,
    an accelerated relaxation phase wherein, for each pixel, a so-called acceleration voltage (Vacc) is applied, via at least two lateral electrodes, generating a lateral electrical field (Era) substantially parallel to said alignment direction, in a vector allowing an accelerated return of the liquid crystal molecules to their orientation of rest, said acceleration voltage being applied when the activation voltage is no longer applied
    wherein, for each pixel, the pixel electrodes and the lateral electrodes are combined and called elementary electrodes, said elementary electrodes taking the form of a strip of substantially identical dimensions and extending in the vertical direction, said elementary electrodes being divided up into a first group and a second group of one strip in every two, and wherein:
    during the activation phase, the activation voltage is applied via the elementary electrodes in combination with the second electrode, and
    the accelerated relaxation phase comprises two sequences:
        a first sequence wherein the acceleration voltage is applied via the first group of elementary electrodes, the elementary electrodes of the second group being connected at high impedance or to a reference potential, and
        a second sequence wherein the acceleration voltage is applied via the second group of elementary electrodes, the elementary electrodes of the first group being connected at high impedance or to a reference potential.

* * * * *